US012688049B2

(12) United States Patent
Wong et al.

(10) Patent No.: US 12,688,049 B2
(45) Date of Patent: Jul. 21, 2026

(54) HIBERNATION WAKE MECHANISM ON A STACK OF SWITCHES USING STACKING LINKS

(71) Applicant: HEWLETT PACKARD ENTERPRISE DEVELOPMENT LP, Spring, TX (US)

(72) Inventors: Sheau Shian Wong, Singapore (SG); Hsu Htet, Singapore (SG); Mahendra Reddy Parlapalli, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 18/669,197

(22) Filed: May 20, 2024

(65) Prior Publication Data

US 2025/0355675 A1      Nov. 20, 2025

(51) Int. Cl.
*G06F 9/4401* (2018.01)
*H04L 45/58* (2022.01)

(52) U.S. Cl.
CPC .......... *G06F 9/4418* (2013.01); *H04L 45/583* (2013.01)

(58) Field of Classification Search
CPC .............................. G06F 9/4418; H04L 45/583
See application file for complete search history.

(56) References Cited

U.S. PATENT DOCUMENTS

| | | | | |
|---|---|---|---|---|
| 9,634,863 B2* | 4/2017 | Mitchell | ............... | H04L 69/163 |
| 10,440,648 B2* | 10/2019 | Zhu | ................... | H04W 52/0216 |
| 2010/0223476 A1* | 9/2010 | Maletsky | ................ | G06F 1/324 |
| | | | | 713/189 |
| 2013/0132745 A1* | 5/2013 | Schoening | ............ | G06F 1/3209 |
| | | | | 713/310 |
| 2015/0169033 A1* | 6/2015 | Shukla | .................. | G06F 1/3234 |
| | | | | 713/320 |
| 2016/0306409 A1* | 10/2016 | Mori | ......................... | H04B 1/04 |
| 2017/0031421 A1* | 2/2017 | Chaplin | ................ | G06F 1/3209 |
| 2017/0070959 A1* | 3/2017 | Khazanov | ......... | H04W 52/0235 |
| 2024/0184733 A1* | 6/2024 | Jaramillo | ............ | G06F 13/4282 |
| 2025/0106163 A1* | 3/2025 | Barth | .................... | G06F 1/3234 |

* cited by examiner

*Primary Examiner* — Aurel Prifti
(74) *Attorney, Agent, or Firm* — Yao Legal Services, Inc.

(57) ABSTRACT

A method and system for facilitating wake-up on a stack of network devices are provided. During operation, the system receives, by a commander device of the stack of network devices, a notification which indicates that the commander device is to wake up from a hibernation state. The commander device boots up in response to receiving the notification. The commander device transmits a wake-up signal to a first member device of the stack of network devices via a first stacking link coupling to the first member device. The system allows the first member device to boot up from the hibernation state in response to detecting the wake-up signal and to transmit the wake-up signal to a second member device via a second stacking link coupling to the second member device.

20 Claims, 6 Drawing Sheets

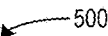

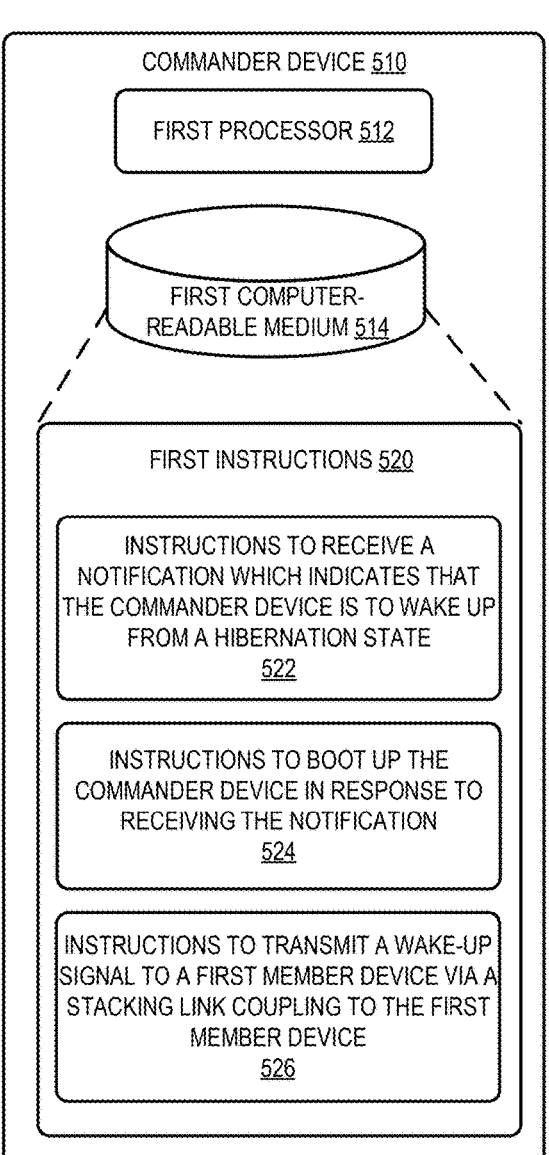

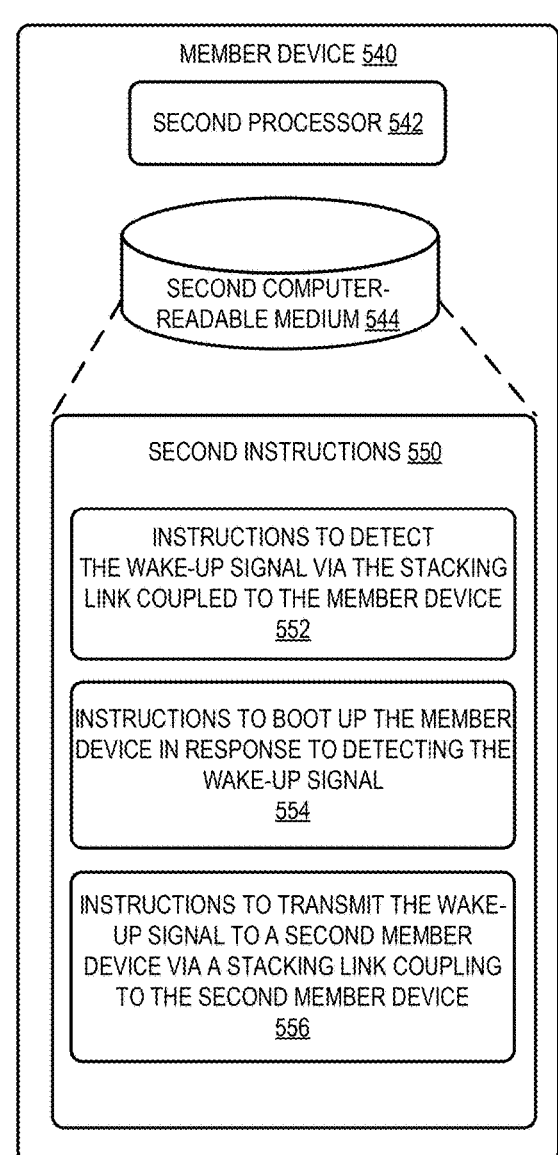

COMMANDER DEVICE 510

FIRST PROCESSOR 512

FIRST COMPUTER-READABLE MEDIUM 514

FIRST INSTRUCTIONS 520

INSTRUCTIONS TO RECEIVE A NOTIFICATION WHICH INDICATES THAT THE COMMANDER DEVICE IS TO WAKE UP FROM A HIBERNATION STATE 522

INSTRUCTIONS TO BOOT UP THE COMMANDER DEVICE IN RESPONSE TO RECEIVING THE NOTIFICATION 524

INSTRUCTIONS TO TRANSMIT A WAKE-UP SIGNAL TO A FIRST MEMBER DEVICE VIA A STACKING LINK COUPLING TO THE FIRST MEMBER DEVICE 526

MEMBER DEVICE 540

SECOND PROCESSOR 542

SECOND COMPUTER-READABLE MEDIUM 544

SECOND INSTRUCTIONS 550

INSTRUCTIONS TO DETECT THE WAKE-UP SIGNAL VIA THE STACKING LINK COUPLED TO THE MEMBER DEVICE 552

INSTRUCTIONS TO BOOT UP THE MEMBER DEVICE IN RESPONSE TO DETECTING THE WAKE-UP SIGNAL 554

INSTRUCTIONS TO TRANSMIT THE WAKE-UP SIGNAL TO A SECOND MEMBER DEVICE VIA A STACKING LINK COUPLING TO THE SECOND MEMBER DEVICE 556

FIG. 5

HIBERNATION WAKE MECHANISM ON A STACK OF SWITCHES USING STACKING LINKS

BACKGROUND

Field

A plurality of switches may be stacked together to form a single logical "stacked switch." In a stacked switch, all member switches should be woken up from hibernation together. One method for waking up all the switches together is to use a configured wake-up time, which may lack operational flexibility. Another method is to manually press a button on a switch. However, this method requires manually pressing the button on each individual switch. Yet another method is to receive, from a controller, a "magic packet" on a Wake-on-LAN (WoL)-capable port. The magic packet can indicate that the receiving entity is to wake from hibernation and boot up. However, this feature requires that the receiving switch be connected to the controller via an Out of Band Management (OOBM) interface, and connecting all the switches in the stack to the controller via the OOBM interface can be costly and inefficient.

BRIEF DESCRIPTION OF THE FIGURES

FIG. 5 illustrates a computer system which facilitates a hibernation wake mechanism on a stack of switches using stacking links, in accordance with an aspect of the present application.

In the figures, like reference numerals refer to the same figure elements.

DETAILED DESCRIPTION

Figure 1:
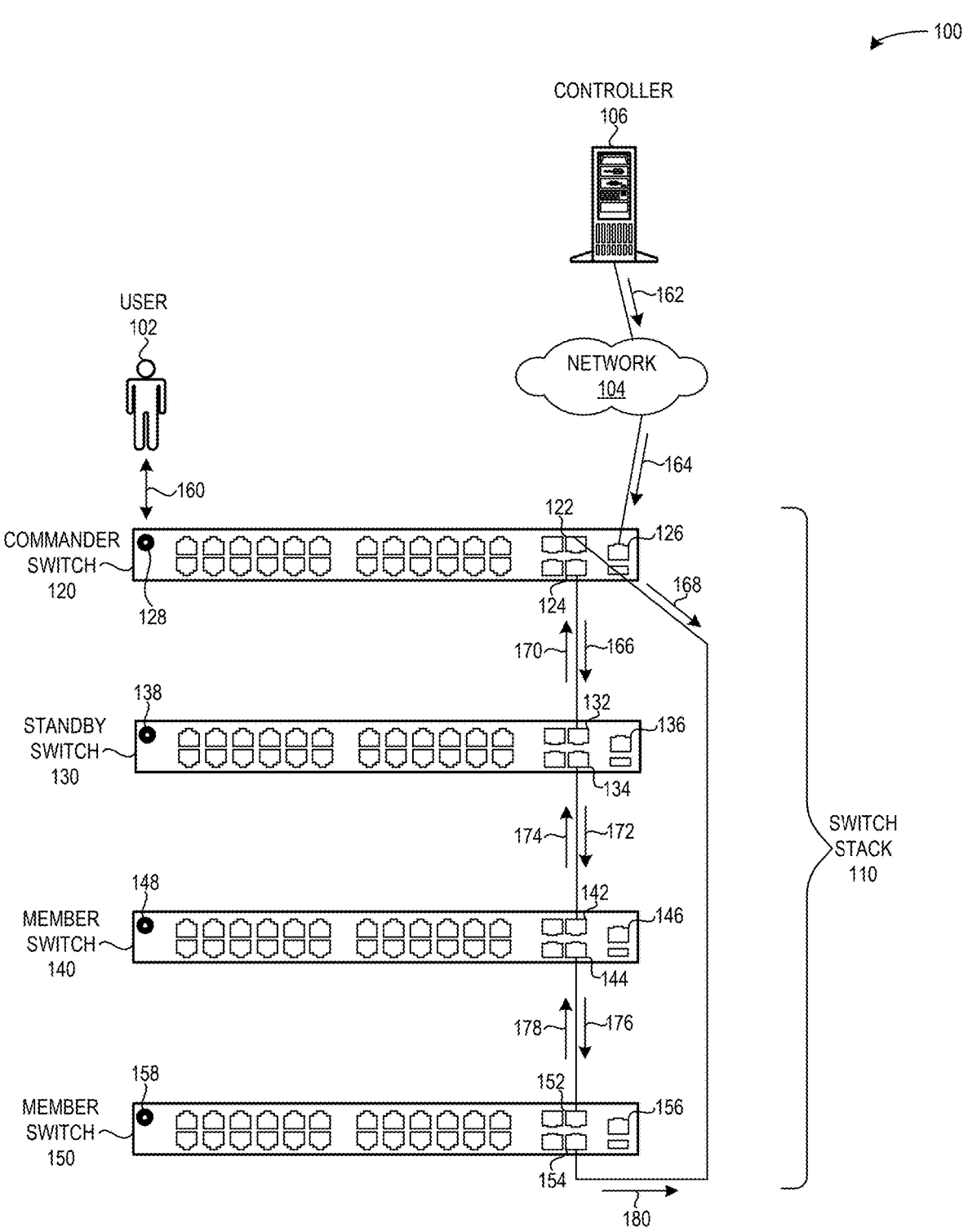
FIG. 1 illustrates an environment which facilitates a hibernation wake mechanism on a stack of switches using stacking links, in accordance with an aspect of the present application.

Aspects of the instant application provide a hibernation wake mechanism on a "stack of switches" using stacking links. A stack of switches (also referred to as "switch stack" or a "stacked switch") can include a plurality of switches connected in, e.g., a ring topology, over "stacking links." A stacking link can connect two switches using fiber optic cable or copper-based cables.

In a stacked switch, all member switches should be woken up from hibernation together. Three methods may be used to wake a switch which is in hibernation. The first method for waking a switch is to use a configured wake-up time. This method can be used to wake all the switches together in the stacked switch. However, while this first method may be convenient for users, it lacks flexibility, as the wake-up time must be configured for each switch prior to placing the switches in hibernation. A second method is to manually press a button on a switch. The button can be a power button which boots the switch up from the hibernation state or turns the switch on from a power-off state. Using this method to wake all the switches together in the stacked switch can require manually pressing the button on each individual switch, which can be cumbersome and inefficient. A third method is for a switch to receive, from a controller, a "magic packet" on a Wake-on-LAN (WoL)-capable port. The magic packet can indicate that the receiving entity is to wake from hibernation and boot up. However, this feature requires that the receiving switch be connected to the controller via an Out of Band Management (OOBM) interface as the WoL magic packet can only be transmitted via an OOBM interface. Connecting all the switches in the stacked switch to the controller via respective OOBM ports on each switch, as well as maintaining the connection between each switch and the controller in order to receive a magic packet, can be costly and inefficient. In addition, forwarding the magic packet to adjacent switches may require waiting for each switch to wake and boot up to the point where it can transmit the magic packet. A switch can "boot up" by loading a power-on self-test (POST) program which can perform hardware tests and loading the boot loader software. The boot loader can perform CPU initialization, initialize the flash file system, locate (and load) an operating system (OS) image into memory, and hand control over to the OS. Given that the boot time of a switch may take on the order of minutes, transmitting or propagating a magic packet (received by one switch from the controller) through the switch stack may result in a significantly increased wait time for waking all the switches in the stack from hibernation.

Aspects of the instant application can address the limitations of the second and third methods by providing an energy-detecting hibernation wake mechanism for a stacked switch using stacking links. Switches in a stacked switch can be connected in a ring topology via, e.g., stacking links over ports configured as stacking links. The switches in the stacked switch can include a commander switch, a standby switch, and one or more member switches. The commander switch can include a port configured to receive traffic via an out of band management (OOBM) interface (also referred to as "OOBM port"). The switches in the stacked switch can be in hibernation (i.e., in a hibernation mode).

Using the third method (WoL packet), a controller can send, and the commander switch can receive, a "magic packet" on a WoL-capable port, i.e., the controller can send the WoL packet over the OOBM interface to the commander switch. Upon receiving the WoL packet, the commander switch can wake from hibernation, boot up, enable its ports configured as stacking links, and send an optical or electrical wake-up signal (also referred to as "a pulse of energy") via the stacking links to one or more switches (e.g., to two switches which are each connected to the commander switch via stacking links in the ring topology).

Upon receiving the wake-up signal, the receiving member switch can wake from hibernation, boot up, enable its ports configured as stacking links, and send the wake-up signal via its stacking links to one or more other switches (e.g., to two other switches which are each connected to the receiving member switch via stacking links in the ring topology). This process can continue until all switches in the stacked switch have been woken up.

Sending the wake-up signal as a pulse of energy can be executed within five seconds after booting up. As an example, this can allow the wake-up signal to be propagated through and wake up all members in a 10-member stack within 30 seconds, which is significantly faster and more efficient than merely propagating the magic packet through the stack (on the order of minutes).

The described process of sending the wake-up signal as a pulse of energy via the stacking links can also be used in the second method, i.e., pressing the button on the commander switch, which can result in sending the wake-up signal via the stacking links of the commander switch and propagating the wake-up signal to other switches. In some aspects, a user can press the button on any single switch, which can trigger the propagation of the wake-up signal as described herein.

Thus, the described aspects provide a hibernation wake mechanism which can efficiently propagate a wake-up signal to all switches in a switch stack by allowing each switch which receives the wake-up signal to boot up and propagate the wake-up signal to adjacent members, e.g., via ports configured as stacking links.

The terms "magic packet" and "Wake-on-LAN (WoL) packet" are used interchangeably in this disclosure and refer to a standard wake-up packet or frame which targets a specific network interface, e.g., by enabling remote access to a computer that is in a power-saving or hibernation state.

The terms "switch stack," "stacked switch," and "stack of switches" are used interchangeably in this disclosure and refer to a plurality of switches which are connected to each other and can operate together as a single unit, e.g., in a Virtual Switching Framework (VSF) as a VSF stack. In this disclosure, the switches in a switch stack are depicted as being connected in a ring topology. However, other topologies may be used, e.g., a mesh topology or a chain topology.

The terms "stacking link" and "stack-link" are used interchangeably in this disclosure and refer to a link which couples two computing devices via, e.g., ports which have been configured as stacking links on each of the two computing devices. The computing devices can be switches in a stack of switches which can communicate with each other via their respective ports configured as stacking links. The configured ports may be coupled and allow communication over fiber optic cable or copper-based cable, e.g., direct access copper (DAC) cable. A pulse of energy can be sent via the configured ports over the respective cables. For example, laser signals may be sent over the fiber optic cable and electrical signals may be sent over the copper-based cable.

FIG. 1 illustrates an environment 100 which facilitates a hibernation wake mechanism on a stack of switches using stacking links, in accordance with an aspect of the present application. Environment 100 can depict a stack of switches as a switch stack 110 with four switches, including: a commander switch 120; a standby switch 130; a member switch 140; and a member switch 150. Each of the four switches 120, 130, 140, and 150 in switch stack 110 can be coupled to two other switches in switch stack 110 in a ring topology, over ports which can be enabled and configured as stacking links. For example: commander switch 120 can include ports 122 and 124 configured as stacking links, where port 122 is configured as a stacking link coupling to member switch 150 and port 124 is configured as a stacking link coupling to standby switch 130; standby switch 130 can include ports 132 and 134 configured as stacking links, where port 132 is configured as a stacking link coupling to commander switch 120 and port 134 is configured as a stacking link coupling to member switch 140; member switch 140 can include ports 142 and 144 configured as stacking links, where port 142 is configured as a stacking link coupling to standby switch 130 and port 144 is configured as a stacking link coupling to member switch 150; and member switch 150 can include ports 152 and 154 configured as stacking links, where port 152 is configured as a stacking link coupling to member switch 140 and port 154 is configured as a stacking link coupling to commander switch 120.

The ports which are enabled and configured as stacking links may be connected using a small form-factor pluggable (SFP) interface. For example, using fiber optic cable, on the SFP connector from a sender, the output signal may be sent via pad 3 ("TX_DISABLE"), which can be turned on or off to stop or start sending an optical signal. The corresponding input signal may be received or reflected at the other end by a receiver via pad 8 ("RX_LOS"), where a logic high indicates that no signal is detected while a logic low indicates that a signal is detected. In another example, using a copper-based cable, the output signal may be sent based on a differential via pads 18/19 ("TD+/TD−"), while the corresponding input signal may be received via pads 12/13 ("RD+/RD−"). Other types of connectors may be used, including but not limited to an enhanced SFP (SFP+) and a quad SFP (QSFP).

Commander switch 120 can also include an OOBM management port 126, which can be enabled (e.g., activated to be configured) and configured to receive data or packets from an OOBM interface, e.g., from a controller. The other switches (130, 140, and 150) can also include an OOBM management port (e.g., respectively, ports 136, 146, and 156), which ports can be disabled. In some aspects, OOBM port 136 on standby switch 130 may be enabled for redundancy or backup purposes. For example, OOBM port 136 may be enabled upon detection of a failure related to the OOBM interface communications transmitted via 164 and received by OOBM port 126 of commander switch 120. Enabling OOBM port 136 can allow standby switch 130 to receive magic packets from controller 106 and trigger the propagation of the wake-up signal or energy pulse through switch stack 110.

Commander switch 120 can further include a power/wake button 128, which when pressed, can manually wake a switch which is hibernation and cause the switch to boot up. A user 102 can manually press button 128 on commander switch 120 (via a communication 160), which can cause commander switch to wake up from a hibernation state and perform the operations of the hibernation wake mechanism as described herein and below. The other switches (130, 140, and 150) can also include power/wake buttons (e.g., respectively, 138, 148 and 158), which buttons can also be manually pressed and cause the respective switch to wake up from a hibernation state.

During operation, commander switch 120 can receive on its OOBM port 126 a notification from controller 106 over a network 104 which indicates that commander switch 120 is to wake up from a hibernation state (e.g., via communications 162 and 164). The notification can be sent by controller 106 and can include a WoL packet which indicates that the receiving entity (here, commander switch 120) is to wake up from a hibernation state and boot up (third method). The notification can also be sent by a user 102 manually pressing a button 128 on commander switch 120 (e.g., via communication 160) (second method). Commander switch 120 can boot up in response to receiving the notification and transmit a wake-up signal via its stacking links.

For example, in response to receiving the notification from controller 106 commander switch 120 can send a wake-up signal via port 122 (configured as a stacking link) to member switch 150 (communication 168) and via port 124 (configured as a stacking link) to standby switch 130 (communication 166). The wake-up signal sent from the commander switch to other switches and between the other switches via the stacking links can be transmitted as an optical signal over a fiber optic cable or as an electrical signal over a copper-based cable, such as a direct attach copper (DAC) cable. The wake-up signal can be a pulse of energy with a predetermined minimum width and a predetermined minimum amplitude, as described below in relation to FIG. 3.

Each switch which receives the wake-up signal can boot up from the hibernation state (becoming an "awake" switch) in response to receiving the wake-up signal and further transmit the wake-up signal via its ports configured as stacking links to the coupled switches. If a switch has already woken from hibernation and is no longer in the hibernation state, the awake switch will not transmit any wake-up signal in response to receiving a wake-up signal from another switch. The awake switch can simply ignore the received wake-up signal and refrain from performing any actions in response to receiving the wake-up signal, including refraining from transmitting the wake-up signal to any other member switches. That is, the wake-up signal may only be transmitted by a switch which receives the signal while in hibernation and subsequently boots up. The wake-up signal may not be transmitted by a switch which receives the signal while no longer in the hibernation state (i.e., is already awake). Thus, given the ring topology of switch stack 110, the wake-up signal may be transmitted around the ring in both directions at the same time (e.g., in parallel) until all switches have been woken up.

Continuing with the communications in environment 100, in response to receiving the wake-up signal from commander switch 120 via port 124, standby switch 130 can send a notification (e.g., a wake-up signal) via port 134 (configured as a stacking link) to member switch 140 (communication 172). Standby switch 130 can also send the wake-up signal via port 132 to commander switch 120 (communication 170), but because commander switch 120 is already awake and not in hibernation state, commander switch 120 can ignore that wake-up signal.

In response to receiving the wake-up signal from standby switch 130 via port 142 (communication 172), member switch 140 (if in hibernation) can wake, boot up, and send a wake-up signal via port 144 (configured as a stacking link) to member switch 150 (communication 176). Member switch 140 can also send the wake-up signal via port 142 to standby switch 130 (communication 174), but because standby switch 130 is already awake and not in hibernation state, standby switch 120 can ignore that wake-up signal.

In response to receiving the wake-up signal from member switch 140 via port 152 (communication 176), member switch 150 (if in hibernation) can wake, boot up, and send a wake-up signal via port 154 (configured as a stacking link) to commander switch 120 (communication 180). Because commander switch 120 is already awake and not in the hibernation state, commander switch 120 can ignore that wake-up signal. Similarly, member switch 150 can send the wake-up signal via port 152 to member switch 140 (communication 178), but because member switch 140 is already awake and not in hibernation state, member switch 140 can ignore that wake-up signal.

At this point, all switches in switch stack 110 have been successfully woken from hibernation based on the single notification sent from controller 106. Because each switch which receives the wake-up signal and boots up then sends the wake-up signal to two switches, based on the ring topology, the wake-up signal may take various paths through the switch stack until all the switches have been woken from hibernation. For example, the wake-up signal sent from commander switch 120 to member switch 150 (communication 168 sent from port 122 of commander switch 120 and received via port 154 of member switch 150) may wake up member switch 150 prior to member switch receiving the wake-up signal from member switch 140 (communication 176 sent from port 144 of member switch 140 and received via port 152 of member switch 150). In this case, in response to receiving the wake-up signal from commander switch 120 via port 154, member switch 150 can send a wake-up signal via port 152 (configured as a stacking link) to member switch 140 (communication 178). Member switch 150 can also send the wake-up signal via port 154 to commander switch 120 (communication 180), but because commander switch 120 is already awake (i.e., not in hibernation state), commander switch 140 can ignore that wake-up signal and refrain from performing any actions based on receiving that wake-up signal while not in the hibernation state. A timing sequence diagram depicting the flow of the notifications and subsequent wake-up signals (e.g., pulses) is described below in relation to FIG. 2.

In response to receiving the wake-up signal from member switch 150 (communication 178), member switch 140 (if still in hibernation, i.e., not yet woken up based on receiving the wake-up signal from standby switch 130 via communication 172) can wake, boot up, and send a wake-up signal via port 142 to standby switch 130 (communication 174) and via port 144 to member switch 150 (communication 176). If the receiving switches are already awake (i.e., not in hibernation), the receiving switches can ignore the received wake-up signal and refrain from propagating a wake-up signal. Thus, the wake-up signal can be effectively propagated to all the switches in the stack, which can result in waking up all of the switches in the stack in an efficient and expeditious manner.

Transmitting the wake-up signal between stacked switches which are configured in a mesh topology may result in a faster time for all the stacked switches to wake from hibernation than when in a ring topology, while transmitting the wake-up signal between stacked switches which are configured in a chain topology may result in a slower time than when in a ring topology.

Figure 2:
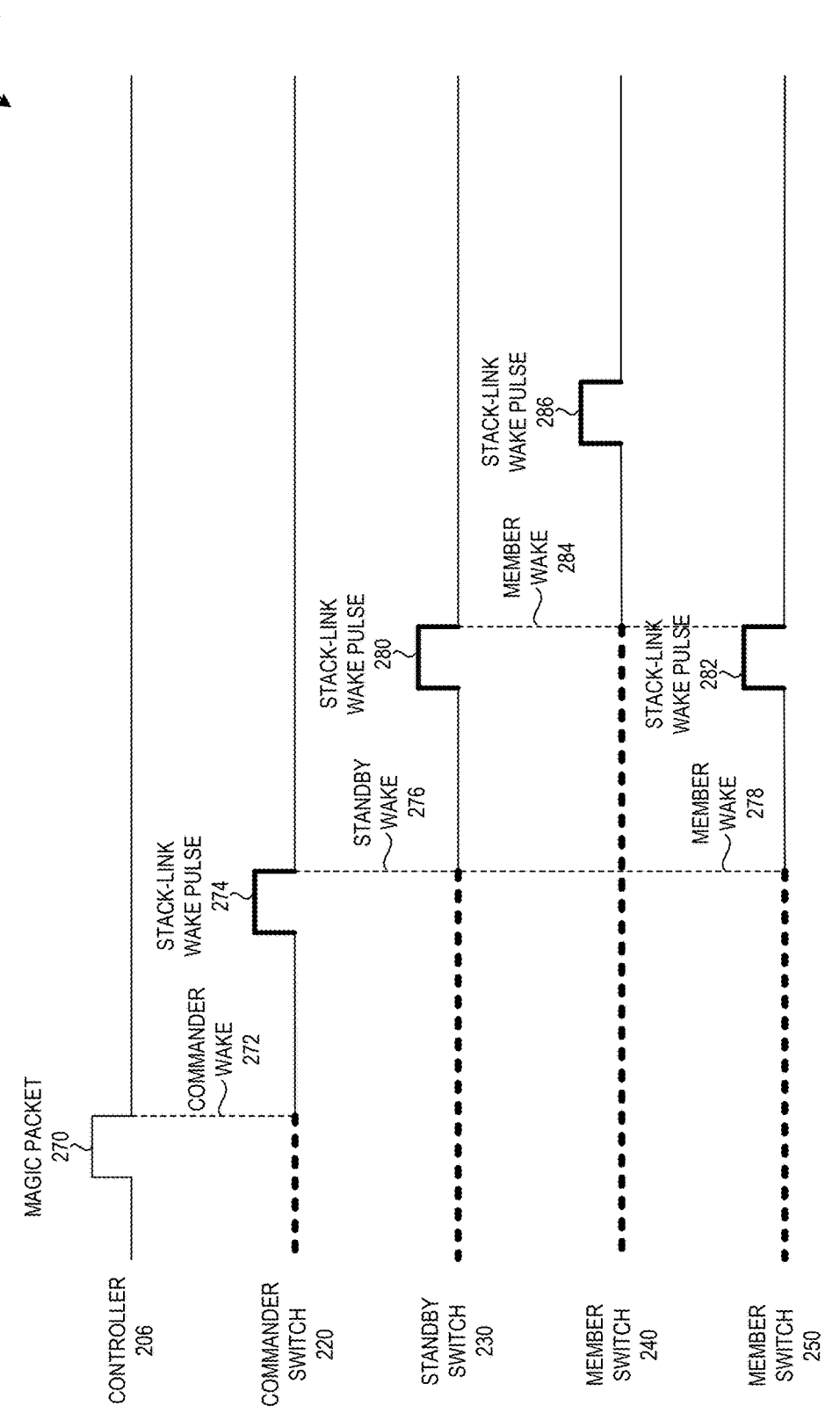
FIG. 2 illustrates a diagram illustrating a timing sequence which facilitates a hibernation wake mechanism on a stack of switches using stacking links, in accordance with an aspect of the present application.

FIG. 2 illustrates a diagram 200 illustrating a timing sequence which facilitates a hibernation wake mechanism on a stack of switches using stacking links, in accordance with an aspect of the present application. In diagram 200, the timing of receiving a notification (e.g., a magic packet or a user press button trigger) by a controller 206 and sending/receiving subsequent wake-up signals by a commander switch 220, a standby switch 230, a member switch 240, and a member switch 250 can correspond to the actions described above in relation to, respectively, controller 106, commander switch 120, standby switch 130, member switch 140, and member switch 150 in environment 100 of FIG. 1. The horizontal heavy dashed lines indicate that the respective switch is in a hibernation state.

As depicted in diagram 200, controller 206 can send a magic packet 270 to commander switch 220, which causes commander switch 220 to wake (272). Upon waking from hibernation and booting up, commander switch 220 can send a stack-link wake pulse (274) via its respective stacking links to standby switch 230 and member switch 250, which can wake up both standby switch 230 (276) and member switch 250 (278). Each of standby switch 230 and member switch 250 can also wake from hibernation, boot up, and send a stack-link wake pulse via their respective stacking links (respectively, 280 and 282). One of these two stack-link wave pulses (280 and 282) may be received first by member switch 240 (284) and cause member switch 240 to wake from hibernation, boot up, and send a stack-link wake pulse via its respective stacking links (286). If both of the two stack-link wave pulses (280 and 282) are received at the same time, member switch 240 can wake up based on either of the two pulses. Because the switches coupled to member switch 240 have already been woken up and are no longer in hibernation, stack-link wave pulse 286 may be sent by member switch 240 but ignored by any receiving switches (illustrated by the lack of any members waking in response to receiving stack-link wake pulse 286). Diagram 200 does not depict the stack-link wake pulses which may have been sent to other switches which have already received a stack-link wake pulse, been awoken from hibernation, and booted up.

Figure 3:
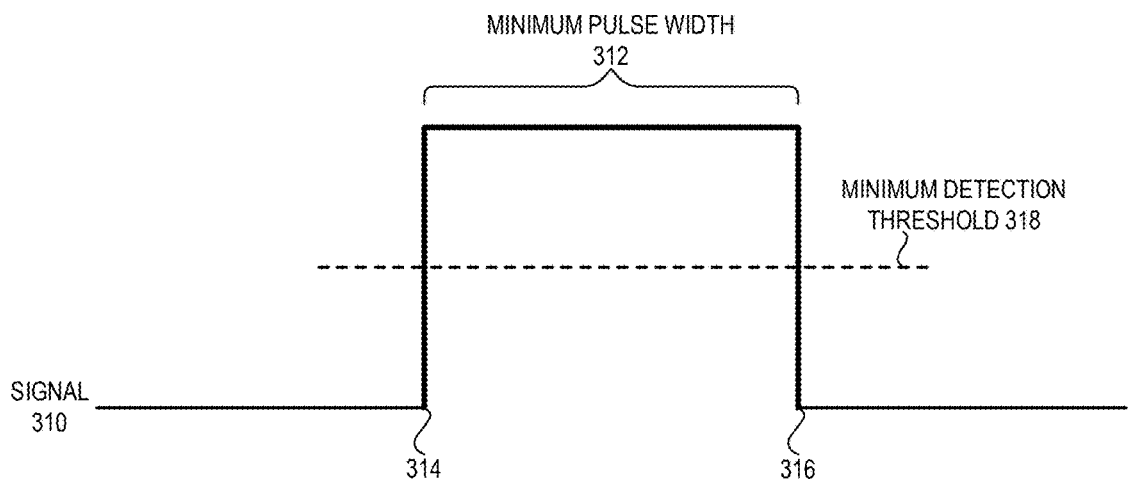
FIG. 3 illustrates a diagram of a triggering pulse which facilitates a hibernation wake mechanism on a stack of switches using stacking links, in accordance with an aspect of the present application.

FIG. 3 illustrates a diagram 300 of a triggering pulse which facilitates a hibernation wake mechanism on a stack of switches using stacking links, in accordance with an aspect of the present application. The triggering pulse can represent a signal 310 which, when reaching or being greater than a predetermined minimum width and a predetermined minimum amplitude, can constitute or be detected as a stack-link pulse wake. The detected stack-link pulse wake can trigger the operations described herein on a switch in hibernation, i.e., waking that switch from the hibernation state and causing the switch to boot up and send the same triggering stack-link pulse via its respective stacking links. In diagram 300, characteristics of the triggering pulse include a minimum pulse width 312 (indicated as between 314 and 316) and a minimum detection threshold 318.

For example, using fiber optic cable, on the transmitting side of the SFP connector, the output signal can be sent via TX_DISABLE with a pulse transition (e.g., the triggering pulse indicated between 314 and 316) of 0 volts (V) to 3.3V, a minimum detection threshold 318 of 2.8V, and a minimum pulse width 312 of 500 microseconds (us). On the receiving side of the SFP connector, the input signal can be received via RX_LOS with a pulse transition of 3.3V to 0V, a minimum detection threshold 318 of 0.5V, and a minimum pulse width 312 of 500 us. As another example, using a copper-based cable such as a DAC, the input signal may be received as a differential Voltage Modulation Amplitude (VMA) via RD+/RD− with a pulse transition of 0 millivolts (mV) to 500 mV, a minimum detection threshold 318 of 0.5V, and a minimum pulse width 312 of 500 us. The input signal may also be received as a single-ended voltage via RD+/RD− with a pulse transition of 0V to 1.5V, a minimum detection threshold 318 of 1.2V, and a minimum pulse width 312 of 500 us.

Figure 4:
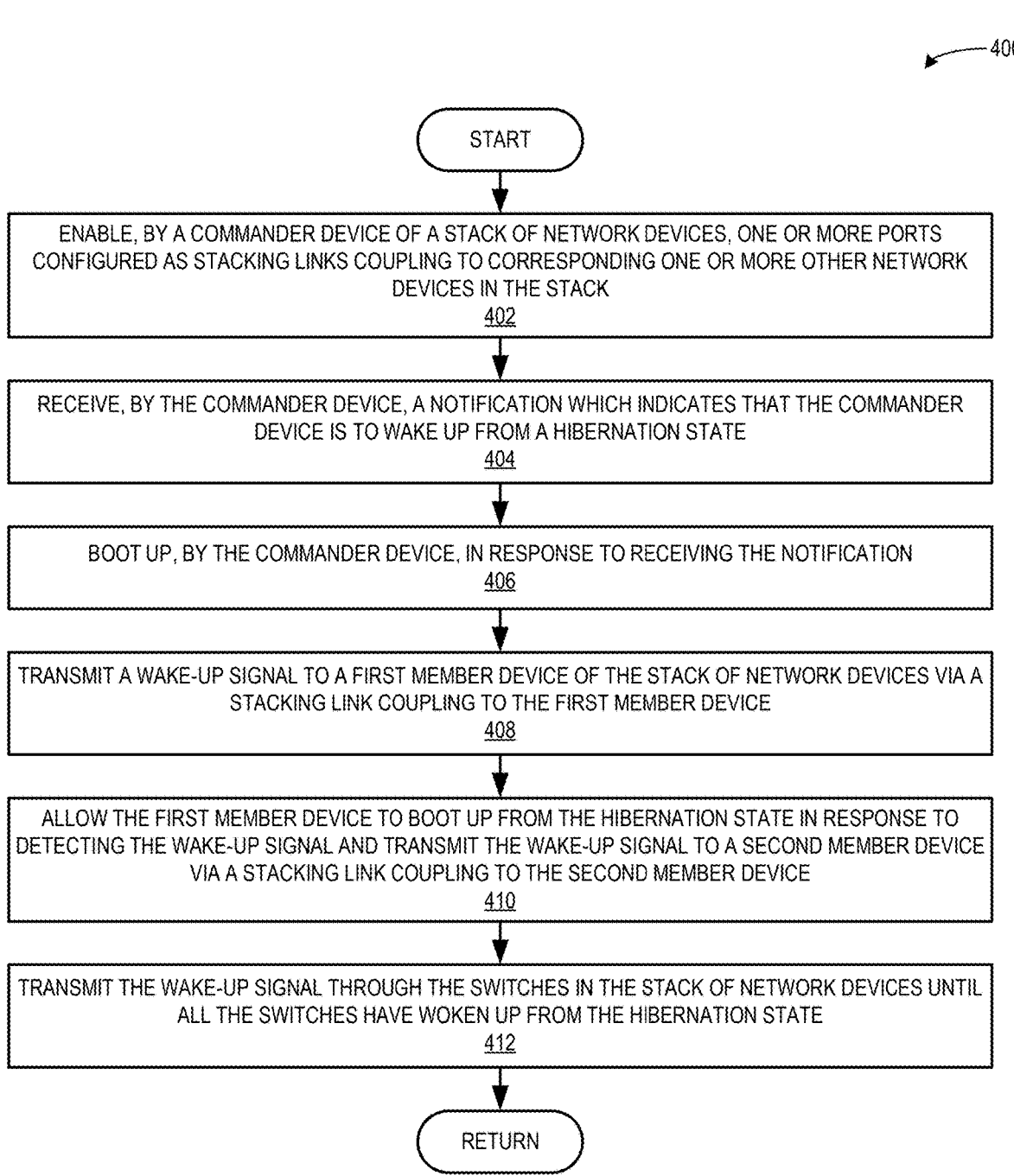
FIG. 4 presents a flowchart illustrating a method which facilitates a hibernation wake mechanism on a stack of switches using stacking links, in accordance with an aspect of the present application.

FIG. 4 presents a flowchart 400 illustrating a method which facilitates a hibernation wake mechanism on a stack of switches using stacking links, in accordance with an aspect of the present application. During operation, a commander device of a stack of network devices enables one or more ports configured as stacking links coupling to corresponding one or more other network devices in the stack (operation 402). The commander device can be a commander switch and the one or more other network devices may include a standby device (e.g., a standby switch) and one or more member devices (e.g., member switches). Each device (e.g., switch) in the stack may enable one or more of its ports configured as stacking links coupling to other network devices in the stack. The network devices may be connected in a ring topology, as described above in relation to environment 100 of FIG. 1, or may be connected in other topologies, e.g., mesh, chain, or other.

The system receives, by a commander device of the stack of network devices, a notification which indicates that the commander device is to wake up from a hibernation state (operation 404). The commander device may receive the notification from a controller via an active or enabled OOBM port on the commander device, as described above in relation to receiving a notification via communication 164 on OOBM port 126 of commander switch 120 in FIG. 1 and as described above in relation to controller 206 sending magic packet 270 in timing sequence diagram 200 of FIG. 2. In some aspects, the commander device may receive a notification in the form of a user manually pressing a power/wake button on commander switch 120, as described above in relation to user 102 pressing button 128 via communication 160 on commander switch 120 in FIG. 1. The commander device boots up in response to receiving the notification (operation 406). The commander device transmits a wake-up signal to a first member device of the stack of network devices via a first stacking link coupling to the first member device (operation 408). The wake-up signal may be sent as an optical signal (e.g., laser) over a fiber optic cable or as an electrical signal over a DAC cable. The wake-up signal may be sent based on the timing sequence depicted above, e.g., in relation to commander switch 220 waking (272) and sending a pulse (274) in FIG. 2. The system allows the first member device to boot up from the hibernation state in response to detecting the wake-up signal and to transmit the wake-up signal to a second member device via a second stacking link coupling to the second member device (operation 410). Continuing with the example in FIG. 2, pulse 274 may be detected by two switches in the stack, and may cause or allow the detecting two switches to wake and boot up (wake 276 by standby switch 230 and wake 278 by member switch 250) and also send a stack-link wake pulse. The system transmits the wake-up signal through the switches in the stack of network devices until all the switches have woken up from hibernation state (operation 412), as described above in relation to switches 120, 130, 140, and 150 of FIG. 1 and switches 220, 230, 240, and 250 of FIG. 2.

FIG. 5 illustrates a computer system 500 which facilitates a hibernation wake mechanism on a stack of switches using stacking links, in accordance with an aspect of the present application. Computer system 500 can represent a stack of network devices, comprising: a commander device 510 comprising at least one first processing resource (depicted as first processor 512) and at least one first non-transitory computer-readable medium (CRM) 514 storing first instructions 520; and one or more member devices, wherein a respective member device comprises at least one second processing resource and at least one second non-transitory computer-readable medium storing second instructions, e.g., a member device 540 comprising a second processor 542 and a second non-transitory computer-readable medium (CRM) 544 storing second instructions 550.

First instructions 520 when executed by first processor 512 can include instructions 522 to receive a notification which indicates that the commander device is to wake up from a hibernation state. The notification may be sent by a controller and received on an enabled OOBM port of the commander device, as described above in relation to communication 164 on OOBM port 126 of commander switch 120 in FIG. 1. In some aspects, the notification may include detecting a user manually pressing a power/wake button on the commander device, as described above in relation to user 102 pressing button 128 on commander switch 120 in FIG. 1.

First instructions 520 can also include instructions 524 to boot up the commander device in response to receiving the notification. First instructions 520 can also include instructions 526 to transmit a wake-up signal to a first member device via a first stacking link coupling to the first member device. The wake-up signal can be an energy pulse, e.g., an optical or laser signal over a fiber optic cable or an electrical signal over a copper-based cable, as depicted above in relation to the timing sequence of FIG. 2. The energy pulse may be associated with a predetermined minimum width and a predetermined amplitude.

Second instructions 550 when executed by first processor can include instructions 552 to detect the wake-up signal via the stacking link coupled to the member device. Each device may detect, via a respective stacking link coupling to a transmitting device, the wake-up signal. The stacking link can be based on, e.g., an SFP-based connector. Second instructions 550 can also include instructions 554 to boot up a first member device from the hibernation state in response to detecting the wake-up signal. Second instructions 550 can include instructions 556 to transmit the wake-up signal to a second member device via a second stacking link coupling to the second member device. For example, as described above in FIG. 2, stack-link wake pulse 274 may be detected by two switches in the stack, and may cause or allow the detecting two switches to wake and boot up (wake 276 by standby switch 230 and wake 278 by member switch 250) and also send a stack-link wake pulse.

Instructions 520 and 550 of, respectively, first CRM 514 and second CRM 544 may include more instructions than those shown in FIG. 5. For example, CRM 514 and CRM 544 can also store instructions for executing the operations described above in relation to: the environment of FIG. 1; the operations depicted in flowchart 400 of FIG. 4; and instructions 632-638 of storage medium 620 in FIG. 6.

Figure 6:
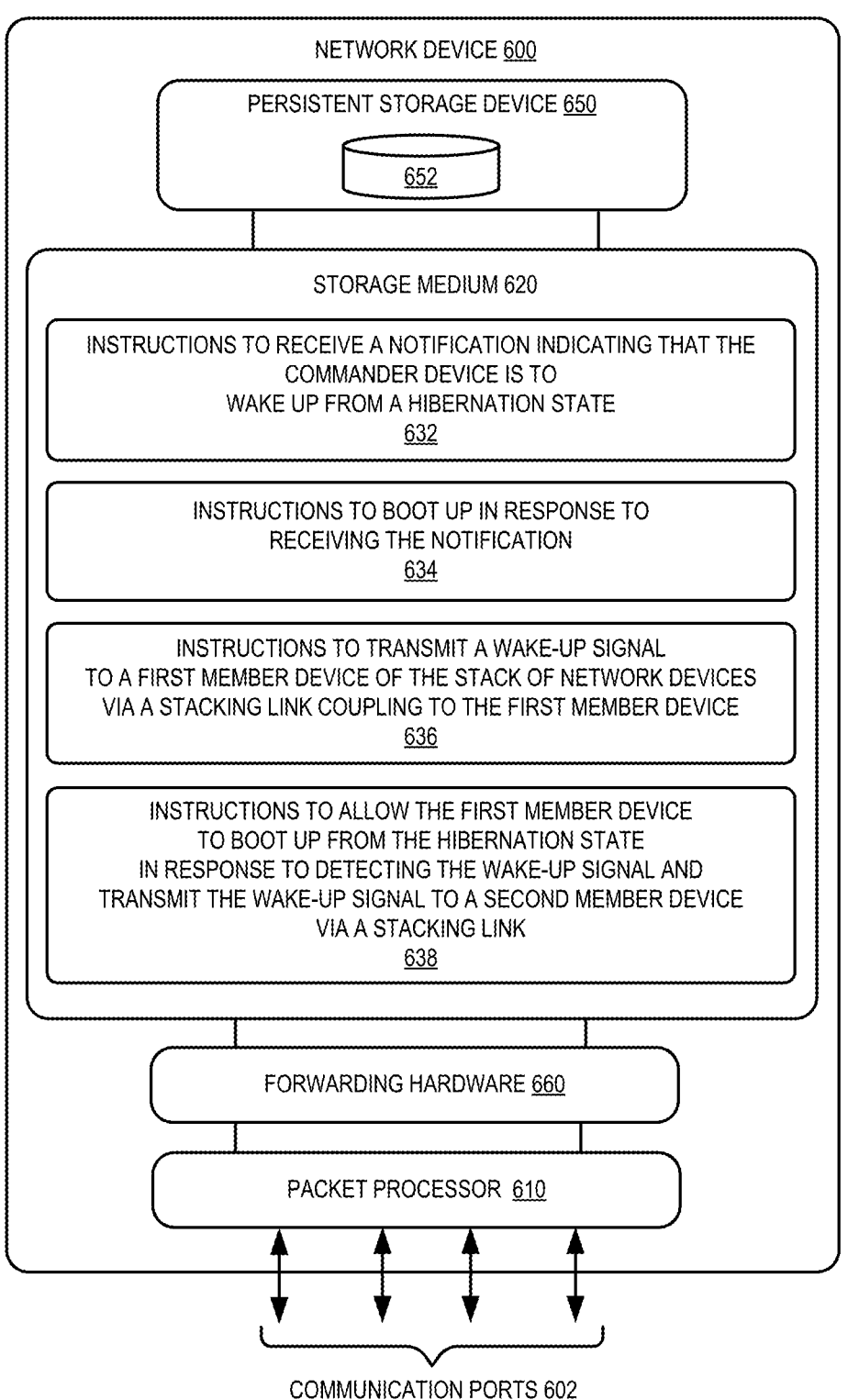
FIG. 6 illustrates a network device which facilitates a hibernation wake mechanism on a stack of switches using stacking links, in accordance with an aspect of the present application.

FIG. 6 illustrates a network device 600 which facilitates a hibernation wake mechanism on a stack of switches using stacking links, in accordance with an aspect of the present application. Network device 600, which can also be referred to as a switch, can include a number of communication ports 602, a packet processor 610, and a persistent (i.e., non-transitory) storage device 650. Network device 600 can also include forwarding hardware 660 (e.g., processing hardware of network device 600, such as its application-specific integrated circuit (ASIC) chips), which includes information based on which network device 600 processes packets (e.g., determines output ports for packets).

Packet processor 610 can extract and process header information from the received packets. Packet processor 610 can be implemented in hardware, software, or a combination of hardware and software. Packet processor 610 can determine header information of received packets and forwarding hardware 660 can further determine how (e.g., which output ports) to forward the received packets. Packet processor 610 can identify a network device identifier (e.g., a MAC address and/or an IP address) associated with network device 600 in the header of a packet. Network device 600 can include a storage medium 620. In some examples, storage medium 620 can include a set of volatile memory devices (e.g., dual in-line memory module (DIMM)) (not shown). Network device 600 can operate as a commander switch in a stack of switches which are configured in, e.g., a ring topology. The stack of switches can include a commander switch, a standby switch, and one or more member switches, as described above in relation to, respectively, commander switch 120, standby switch 130, and member switches 140 and 150 of FIG. 1.

Communication ports 602 can include inter-device communication channels for communication with other network devices and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port. Communication ports 602 can also be configured as stacking links which couple switches in a stack of switches to each other, as described above in relation to ports 122/124, 132/134, 142/144, and 152/154 of, respectively, switches 120, 130, 140, and 150 of FIG. 1. When configured as stacking links, data may be transmitted and received via communication ports 602 over fiber optic cable as energy laser signals or over copper-based cable (such as DAC cable) as electrical signals, as described above in relation to FIGS. 1 and 2. Communication ports 602 can further include OOBM ports which can be enabled (e.g., port 126 and, in some aspects, port 136 of FIG. 1) or disabled (e.g., ports 146 and 156 and, in some aspects, port 136 of FIG. 1).

Network device 600 can maintain a database 652 (e.g., in storage device 650). Database 652 can be a relational database and may run on one or more Database Management System (DBMS) instances. Database 652 can store information associated with the routing, configuration, and interfaces of network device 600. Database 652 may store the routing data structures populated based on various routing protocols. Storage medium 620 can include instructions that allow network device 600 to facilitate a hibernation wake mechanism on a stack of switches (such as switch stack 110) using stacking links. While storage medium 620 is depicted as a separate memory from persistent storage device 650 in network device 600, in some aspects, persistent storage device 650 may include storage medium 620.

Storage medium 620 can further include instructions 632 to receive a notification indicating that the commander device is to wake up from a hibernation state, as described above in relation to communication 164 on OOBM port 126 of commander switch 120 in FIG. 1. In some aspects, the notification can be based on a user pressing a power/wake button, e.g., user 102 pressing button 128 on commander switch 120 in FIG. 1. Storage medium 620 can include instructions 634 to boot up in response to receiving the notification. Storage medium 620 can include instructions 636 to transmit a wake-up signal to a first member device of the stack of network devices via a first stacking link coupling to the first member device. The wake-up signal may be an energy pulse which is sent as an optical signal (e.g., laser) over a fiber optic cable or as an electrical signal over a DAC cable. The wake-up signal may be sent based on the timing sequence depicted above, e.g., in relation to commander switch 220 waking (272) and sending a pulse (274) in FIG. 2. The wake-up signal can have a predetermined minimum duration and amplitude, as described above in relation to FIG. 3. Storage medium 620 can also include instructions 638 to allow the first member device to boot up from the hibernation state in response to detecting the wake-up signal and transmit the wake-up signal to a second member device via a second stacking link coupling to the second member device, as described above in relation to FIGS. 1 and 2.

Storage medium 620 may include more instructions than those shown in FIG. 6. For example, storage medium 620 can also store instructions for executing the operations described above in relation to: the environment of FIG. 1; the operations depicted in flowchart 400 of FIG. 4; and the instructions of first CRM 514 and second CRM 544 of computer system 500 in FIG. 5.

In general, the disclosed aspects provide a method, a commander device in a stack of network switches, and a stack of network switches for facilitating wake-up on a stack of network devices. During operation, the system receives, by a commander device of the stack of network devices, a notification which indicates that the commander device is to wake up from a hibernation state. The commander device boots up in response to receiving the notification. The commander device transmits a wake-up signal to a first member device of the stack of network devices via a first stacking link coupling to the first member device. The system allows the first member device to boot up from the hibernation state in response to detecting the wake-up signal and to transmit the wake-up signal to a second member device via a second stacking link coupling to the second member device.

In a variation on this aspect, prior to transmitting the wake-up signal to the first member device, the commander device enables a port configured as the first stacking link.

In a further variation on this aspect, the notification comprises a packet received from a controller via an Out of Band management (OOBM) interface.

In a further variation, the notification is associated with a user operation performed on the commander device.

In a further variation, transmitting the wake-up signal comprises transmitting an optical signal over a fiber optic cable.

In a further variation, transmitting the wake-up signal comprises transmitting an electrical signal over a direct attach copper (DAC) cable.

In a further variation, the wake-up signal comprises a pulse with a predetermined minimum width and a predetermined minimum amplitude.

In another aspect, a commander device in a stack of network devices comprises at least one processing resource, a plurality of ports, and a storage device storing instructions that when executed by the at least one processing resource cause the at least one processing resource to execute the instructions to receive a notification indicating that the commander device is to wake up from a hibernation state. The instructions are further to boot up in response to receiving the notification and to transmit a wake-up signal to a first member device of the stack of network devices via a first stacking link coupling to the first member device. The instructions are further to allow the first member device to boot up from the hibernation state in response to detecting the wake-up signal and transmit the wake-up signal to a second member device via a second stacking link coupling to the second member device. The storage device of the commander device may include more instructions, e.g., the instructions to perform the operations described herein, including in relation to: the environment of FIG. 1; the operations depicted in flowchart 400 of FIG. 4; and the instructions of first CRM 514 and second CRM 544 in FIG. 5.

In yet another aspect, a stack of network devices comprises: a commander device comprising at least one first processor and at least one first non-transitory computer-readable medium storing first instructions; and one or more member devices, wherein a respective member device comprises at least one second processor and at least one second non-transitory computer-readable medium storing second instructions. The first instructions when executed by the at least one first processor are to: receive a notification which indicates that the commander device is to wake up from a hibernation state; boot up the commander device in response to receiving the notification; and transmit a wake-up signal to a first member device via a first stacking link coupling to the first member device. The second instructions when executed by the at least one second processor are to: detect the wake-up signal via the stacking link coupling to the first member device; boot up a first member device from the hibernation state in response to detecting the wake-up signal; and transmit the wake-up signal to a second member device via a second stacking link coupling to the second member device. The stack of network devices may include instructions in addition to the instructions listed above to perform the operations described herein, including in relation to: the environment of FIG. 1; the operations depicted in flowchart 400 of FIG. 4; and instructions 632-638 of storage medium 620 in FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for facilitating wake-up on a stack of network devices, the method comprising:
   receiving, by a commander device of the stack of network devices, a notification which indicates that the commander device is to wake up from a hibernation state;
   booting up, by the commander device, in response to receiving the notification;
   transmitting a wake-up signal as an energy pulse detectable based on a width and amplitude associated with the energy pulse to a first member device of the stack of network devices via a first stacking link coupling to the first member device; and
   allowing the first member device to boot up from the hibernation state in response to receiving the energy pulse on the first stacking link and to transmit the wake-up signal as the energy pulse detectable based on the width and amplitude associated with the energy pulse to a second member device via a second stacking link coupling to the second member device.

2. The method of claim 1, further comprising:

prior to transmitting the wake-up signal to the first member device, enabling, by the commander device, a port configured as the first stacking link.

3. The method of claim 1, wherein the notification comprises a packet received from a controller via an Out of Band management (OOBM) interface.

4. The method of claim 1, wherein the notification is associated with a user operation performed on the commander device.

5. The method of claim 1, wherein transmitting the wake-up signal comprises transmitting an optical signal over a fiber optic cable.

6. The method of claim 1, wherein transmitting the wake-up signal comprises transmitting an electrical signal over a direct attach copper (DAC) cable.

7. The method of claim 1, wherein the wake-up signal comprises a pulse with a predetermined minimum width and a predetermined minimum amplitude.

8. A commander device in a stack of network devices, the commander device comprising:

at least one processing resource;

a plurality of ports; and a storage device storing instructions which when executed by the at least one processing resource cause the at least one processing resource to execute the instructions to:

receive a notification indicating that the commander device is to wake up from a hibernation state;

boot up in response to receiving the notification;

transmit a wake-up signal as an energy pulse detectable based on a width and amplitude associated with the energy pulse to a first member device of the stack of network devices via a first stacking link coupling to the first member device; and allow the first member device to boot up from the hibernation state in response to receiving the energy pulse on the first stacking link and transmit the wake-up signal as the energy pulse detectable based on the width and amplitude associated with the energy pulse to a second member device via a second stacking link coupling to the second member device.

9. The commander device of claim 8, the instructions further to:

prior to transmitting the wake-up signal to the first member device, enable a port configured as the first stacking link; and prior to transmitting the wake-up signal to the second member device, enable a port configured as the second stacking link.

10. The commander device of claim 8, wherein the notification comprises a packet received from a controller via an out of band management (OOBM) interface.

11. The commander device of claim 8, wherein the notification is associated with a user operation performed on the commander device.

12. The commander device of claim 8, the instructions further to:

transmit the wake-up signal by transmitting an optical signal over a fiber optic cable.

13. The commander device of claim 8, the instructions further to:

transmit the wake-up signal by transmitting an electrical signal over a direct attach copper (DAC) cable.

14. The commander device of claim 8, wherein the wake-up signal comprises a pulse with a predetermined minimum width and a predetermined minimum amplitude.

15. A stack of network devices, comprising:

a commander device comprising at least one first processor and at least one first non-transitory computer-readable medium storing first instructions; and one or more member devices, wherein a respective member device comprises at least one second processor and at least one second non-transitory computer-readable medium storing second instructions;

wherein the first instructions when executed by the at least one first processor are to:

receive a notification which indicates that the commander device is to wake up from a hibernation state;

boot up the commander device in response to receiving the notification; and transmit a wake-up signal as an energy pulse detectable based on a width and amplitude associated with the energy pulse to a first member device via a first stacking link coupling to the first member device; and wherein the second instructions when executed by the at least one second processor are to:

receive the wake-up signal via the stacking link coupling to the first member device;

boot up a first member device from the hibernation state in response to receiving the energy pulse on the first stacking link; and transmit the wake-up signal as the energy pulse detectable based on the width and amplitude associated with the energy pulse to a second member device via a second stacking link coupling to the second member device.

16. The stack of network devices of claim 15, wherein the first instructions are further to:

enable a port configured as the first stacking link prior to transmitting the wake-up signal to the first member device; and enable a port configured as the second stacking link prior to transmitting the wake-up signal to the second member device.

17. The stack of network devices of claim 15, wherein the notification comprises at least one of:

a packet received from a controller via an out of band management (OOBM) interface; or a notification associated with a user operation performed on the commander device.

18. The stack of network devices of claim 15, wherein the wake-up signal comprises at least one of an optical signal transmitted over a fiber optic cable or an electrical signal transmitted over a direct attach copper (DAC) cable.

19. The stack of network devices of claim 15, wherein transmitting the wake-up signal to the second member device via the second stacking link causes the second member device to:

boot up from the hibernation state in response to detecting the wake-up signal; and transmit the wake-up signal to a third member device in response to identifying a third stacking link coupling to the third member device.

20. The stack of network devices of claim 15, wherein one of the member devices comprises a standby device for the commander device.

* * * * *